US009109770B2

(12) United States Patent de Lamberterie et al.

(10) Patent No.: US 9,109,770 B2

(45) Date of Patent: Aug. 18, 2015

(54) METHOD OF MANUFACTURING A MOTOR VEHICLE OPTICAL MODULE LENS

(71) Applicant: Valeo Vision, Bobigny Cedex (FR)

(72) Inventors: Antoine de Lamberterie, Paris (FR); Julien Muller, Paris (FR)

(73) Assignee: Valeo Vision, Bobigny (FR)

( * ) Notice: Subject to any disclaimer, the term of this patent is extended or adjusted under 35 U.S.C. 154(b) by 161 days.

(21) Appl. No.: 13/923,655

(22) Filed: Jun. 21, 2013

(65) Prior Publication Data

US 2014/0003079 A1 Jan. 2, 2014

(30) Foreign Application Priority Data

Jun. 27, 2012 (FR) ..................................... 12 56092

(51) Int. Cl.

*G02B 27/10* (2006.01)
*F21V 5/00* (2006.01)
*B29D 11/00* (2006.01)
*F21S 8/10* (2006.01)

(52) U.S. Cl.

CPC ............. *F21S 48/00* (2013.01); *F21S 48/1283* (2013.01)

(58) Field of Classification Search

USPC ............. 359/619, 626, 900; 362/520; 264/1.1
See application file for complete search history.

(56) References Cited

FOREIGN PATENT DOCUMENTS

FR 2925656 6/2009
FR 2931251 11/2009

*Primary Examiner* — Jack Dinh

(74) *Attorney, Agent, or Firm* — Jacox, Meckstroth & Jenkins

(57) ABSTRACT

The present invention concerns a method of manufacturing a lens for motor vehicle lighting modules, the method being intended to generate on the output surface (104) of said lens (100) microstructures formed by level differences situated on said output surface (104), the method including the following steps of forming a meshing on the output surface of said lens such that each mesh has similar dimensions, and generating in each mesh a microstructure formed by an output surface level difference, each level difference having a profile that varies as a function of the position of the mesh on the output surface of the lens.

25 Claims, 1 Drawing Sheet

FIG.1
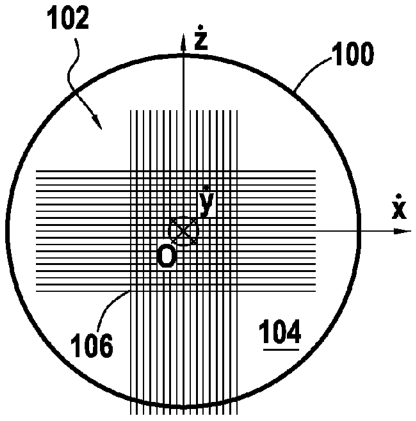
FIG.2
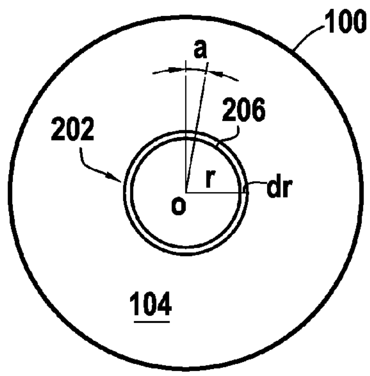
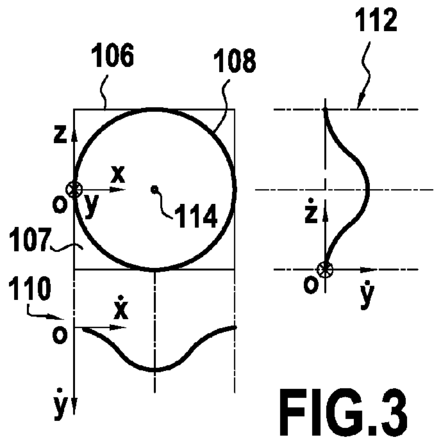
FIG.3
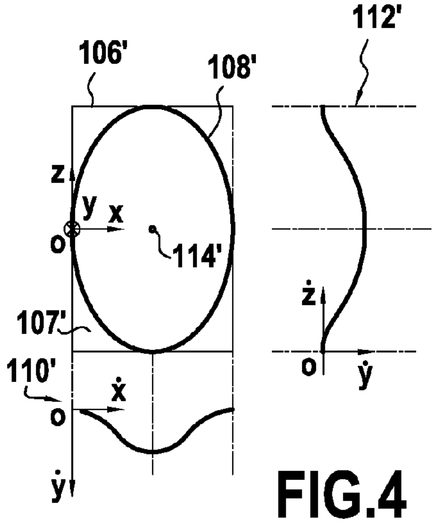
FIG.4
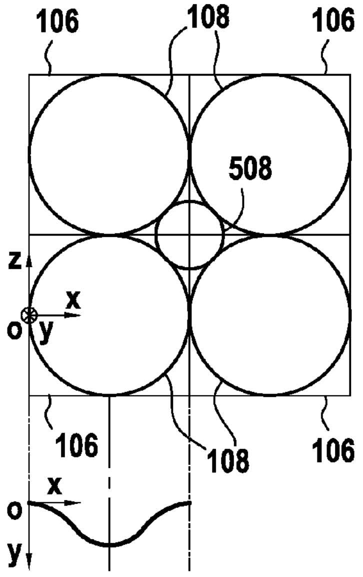
FIG.5

METHOD OF MANUFACTURING A MOTOR VEHICLE OPTICAL MODULE LENS

CROSS-REFERENCE TO RELATED APPLICATIONS

This application claims priority to French Application No. 1256092 filed Jun. 27, 2012, which is incorporated herein by reference and made a part hereof.

BACKGROUND OF THE INVENTION

1. Field of the Invention

The invention relates to a method of manufacturing a motor vehicle optical module lens, notably intended to generate a cut-off line in the optical beam of satisfactory sharpness.

2. Description of the Related Art

It is known to provide the lighting modules of a motor vehicle with means for blocking the upper part of an optical beam generated by this module to prevent dazzling the drivers of oncoming vehicles or followed vehicles. Such means are typically masks in the focal plane of the lens of the elliptical module or reflecting surfaces known as beam folders.

Such lighting modules are typically lights such as position lights, headlights, fog lights, adaptive driving beams (ADB), motorway driving lights, and generally any lighting beams that feature a cut-off line.

The brightness of the generated beam then features a cut-off line, and this can prove to be a problem. In fact, the beam forms an area of high contrast between, on either side of the cut-off line, an illuminated part of the road and a part of the road that remains dark.

In this case, there is a risk of this area of contrast causing discomfort for the driver of the vehicle emitting the beam if the cut-off is too sharp. In fact, movements of the vehicle that modify its attitude relative to the ground as it travels sweep this area over the road, which accentuates the discomfort caused by the contrast.

To prevent this discomfort, which is particularly significant with lighting modules (also known as "headlights") that are elliptical and have smooth lenses, some regulations, such as those that apply in the United States of America, impose the transmission of a minimum optical intensity of the lighting beam above the cut-off line. Thus the discomfort caused by the cut-off line is limited in that this cut-off line is less sharp and more diffuse.

To obtain this reduction of the sharpness of the cut-off line, it is known to situate on the output surface of a lens microstructures forming asperities on this output surface so that rays transmitted by these microstructures are transmitted in directions passing above and below the cut-off line, the sharpness of which is thus reduced.

For example, patent application FR 2 925 656 discloses such a lens in which the microstructures take the form of hollows and bosses disposed on the output surface of the lens either randomly (frosting) or in the form of a relatively regular array.

The document FR 2 931 251 discloses an elliptical motor headlight module lens in which areas with an optical diffusion effect are formed on a surface of the lens and divided into a periodic array of individual cells with respective structural elements, which causes targeted diffusion of the light.

Moreover, it is apparent in other examples that the profile of the microstructures is sinusoidal. Although this profile is simple to manufacture, it nevertheless has the drawback of offsetting the position of the maximum contrast that characterizes the position of the cut-off relative to the rest of the beam, or even of generating a second cut-off line in the beam, which leads to ambiguity when carrying out adjustments that is a serious problem with respect to complying with statutory standards, the double cut-off moreover degrading the range of the beam.

What is needed therefore is an improved method of manufacturing a motor vehicle optical module lens.

SUMMARY OF THE INVENTION

The present invention results from the observation that such methods of manufacture and lenses manufactured in this way do not enable effective control of the diffusion of light above the cut-off threshold. In fact such lenses have microstructures with profiles that are somewhat random and the optical diffusion effect of which is consequently difficult to control.

For example, it is not possible to control with sufficient accuracy the chromatic aberration of the generated beam even though, according to an observation specific to the invention, rays diffused by the central part of a lens contribute more to diffusion above the cut-off line than diffused by the periphery of the lens. In fact, the latter rays exhibit more marked chromatic aberration (color iridizing) and therefore contribute less to diffusion of white light.

Moreover, in the context of a relatively regular array, it is apparent that the positioning of the microstructures relative to each other is not sufficiently precise to enable formation of microstructures optimized as a function of the position of the microstructures.

The present invention aims to remove these drawbacks and relates to a method of manufacturing a lens for motor vehicle lighting modules, the method being intended to generate on the output surface of the lens microstructures formed by level differences situated on the output surface, the method including the following steps:

forming a meshing on the output surface of the lens such that each mesh has similar dimensions, and generating in each mesh a microstructure formed by an output surface level difference, each level difference having a profile that varies as a function of the position of the mesh on the output surface of the lens.

In accordance with the invention, the method includes the additional step of generating secondary level differences situated between different meshes.

Such a method has numerous advantages. It notably has the advantage of using a meshing of the output surface of the lens such that, at the level of its own mesh, each microstructure can be considered independently of the others. Also it is possible to define microstructure profiles specific to each mesh as a function of its position within the meshing.

Because of this, it is possible to generate greater diffusion of the optical beam at the central level of the lens by rays exhibiting reduced chromatic aberration in order to limit the sharpness of the cut-off line. Moreover, these rays partly correct the chromatic aberration associated with rays coming from the peripheral part of the lens.

Furthermore, this same method can be applied to different lenses to generate different levels of sharpness of the cut-off line specific to each lens. In fact, it is sufficient to associate a distinct level difference or secondary level difference profile with each lens to obtain a specific level of sharpness. As a general rule, it is sufficient to increase one dimension (depth, height or aperture) of the level difference or secondary level difference to increase the diffusion of the optical rays in different directions and consequently to reduce the sharpness of the cut-off line.

In one embodiment the method includes the step of generating the level differences or the secondary level differences of the microstructures so that each level difference or each secondary level difference has an axis of symmetry, for example an axis of revolution or of rotation.

In one embodiment, the contour of the level difference or the secondary level difference in a plane perpendicular to the axis of symmetry is circular or elliptical, the latter variant notably enabling a profile to be obtained that varies in different directions such that the diffusion by the microstructures in those different directions can be adjusted independently.

In one embodiment, at the mesh level, the axis of symmetry of each level difference or each secondary level difference is parallel to an axis normal to the output surface of the lens and/or to an optical axis of the lens.

In one embodiment, the profile of each level difference or each secondary level difference is predetermined as a function of the distance of its mesh from a central part of the lens so that at least one common dimension of the level differences, for example a depth or a height and/or an aperture that may correspond to a diameter, decreases with this distance.

In one embodiment, in the mesh, the edges of the level difference or the secondary level difference are situated at the level of the output surface of the lens.

In one embodiment, the profile of the level difference or the secondary level difference is predetermined by mathematical modeling of its surface, typically polynomial modeling that enables better control of the cut-off that notably makes it possible to limit the offsetting of the maximum contrast, or even to prevent the creation of a double cut-off.

The invention also relates to a lens for motor vehicle lighting modules having an output surface provided with microstructures formed by level differences or secondary level differences, characterized in that, these level differences being generated on its output surface by a manufacturing method conforming to any one of the above embodiments:

the level differences form a meshing on the output surface of the lens such that each mesh has similar dimensions, the level differences have a profile depending on the position of the mesh on the output surface of the lens, and the secondary level differences are situated between different meshes.

Depending on the embodiment, the level differences or the secondary level differences are recesses, reliefs or a combination of recesses and reliefs.

The surface of the level differences or the secondary level differences is preferably continuous so that there are no jumps or discontinuities in these level differences.

The surface of the level differences or the secondary level differences is advantageously continuously variable so as not to produce any angular points.

The invention further relates to a motor vehicle lighting module including a lens having an output surface provided with microstructures formed by level differences or secondary level differences generated on its output surface, characterized in that, the level differences or secondary level differences being generated on its output surface by a manufacturing method conforming to any one of the above embodiments:

the level differences form a meshing on the output surface of said lens such that each mesh has similar dimensions, the level differences have a predetermined profile depending on the position of the mesh on the output surface of the lens, and the secondary level differences are situated between different meshes.

Other advantages of the invention will become apparent in the light of the description of one embodiment of the invention given hereinafter by way of nonlimiting illustrative example and with reference to the appended figures, in which:

BRIEF DESCRIPTION OF THE ACCOMPANYING DRAWINGS

FIGS. 1 and 2 represent different embodiments of the surface meshing of a lens in one step of a manufacturing method according to the invention, FIGS. 3 and 4 represent different embodiments of the profile of microstructures formed by a step of a manufacturing method according to the invention, and FIG. 5 represents the surface meshing of a lens by the manufacturing method according to the invention.

In the following description, elements that are identical or have similar functions may be represented in different figures with the same reference.

DETAILED DESCRIPTION OF THE PREFERRED EMBODIMENTS

Similarly, the following description considers level differences and secondary level differences in the form of recesses. This description must nevertheless be extended to level differences and secondary level differences in the form of reliefs, the effects obtained and the resulting advantages being the same, whether the level differences or the secondary level differences are reliefs or recesses.

Referring to FIG. 1, there is represented a first step of a method according to the invention of manufacturing a lens 100 for motor vehicle lighting modules.

During this first step, a meshing (or array) 102 is formed on the output surface 104 of this lens 100, also called the carrier surface, such that each of its meshes 106 has similar dimensions.

In this regard, the meshes are considered to have similar dimensions when their areas do not differ by a multiplier factor exceeding 10, In this example, such meshing 102 is effected using a Cartesian system of axes (O, x, y, z) enabling parallel or perpendicular segments to be defined by varying the horizontal coordinates (Ox) or the vertical coordinates (Oz) on the surface 104 of the lens, i.e. with a zero value along the axis (Oy). In this case the meshing 102 takes the form of a grid in which each mesh 106 corresponds to a tile of substantially square shape.

In another variant represented in FIG. 2, a radial meshing 202 is formed using polar coordinates employing a system of axes (O, r, a) where O corresponds to a center of the surface 104, r the distance (or radius) of a ring of thickness dr situated around the center O and divided into patterns delimited on the one hand by the edges of the ring and on the other hand by two radii forming an angle a. In this case it is possible to define meshes 206 forming concentric rings about the center O of the lens.

It must be noted that in all cases the lens 100 has a three-dimensional curved surface, such as a spherical surface, or even a complex shape that does not have a geometrical center O. The meshing 102 or 202 is then formed by projecting onto the three-dimensional surface 100 a meshing 102 or 202 formed as described above at the level of the optical path followed by a beam transmitted by the lens.

The method of manufacturing the lens includes, after the step of forming the meshing 102, the step of forming in each mesh 106 or 206 a microstructure, also called a well or cavity, generated by an absence of material in accordance with a predetermined profile depending on the position of the mesh in the meshing.

Referring to FIG. 3 and considering a square mesh 106, a recess 108 may be formed so as to exhibit symmetry of revolution about a central axis 114 situated simultaneously at the center of the contour of the recess 108 and at the center of the mesh 106. Thus the horizontal profile 110 (x, y) and the vertical profile 112 (y, z) of the recess 108 are identical.

The recess 108 then has a circular contour in each plane perpendicular to the axis 114, including at the level of the output surface on which the edges 117 of the recess in the meshes are situated, these edges 117 being at the level of the output (carrier) surface of the lens.

Referring to FIG. 4, a recess 108' may also be formed in a rectangular mesh 106' that exhibits symmetry of rotation about the central axis 114'. Thus the horizontal profile 110' (x, y) and the vertical profile 112' (y, z) of the recess are different. In other words the recess 108' has an elliptical contour in each plane perpendicular to the axis 114.

The use of a recess having horizontal and vertical profiles that are either identical or different enables the manufacture of lenses having horizontal and vertical optical properties that are either identical or different. In fact, in the case of a circular profile (FIG. 3), the optical properties of the microstructure are independent of the horizontal or vertical direction of propagation of the optical rays transmitted, while in the second case (FIG. 4) the rays are transmitted differently in the horizontal direction (Ox) and the vertical direction (Oz). Because of this the horizontal and vertical spreading of the beam, which notably depend on this transmission, may differ.

As indicated above, these parameters enable the level of sharpness of the cut-off line to be controlled and/or diffusion of optical rays situated at the center of the lens to be favored. To this end, the predetermined profile is a function of the distance of the mesh from the center of the lens. This profile is advantageously also a function of the height of the mesh on the lens. The amplitude of the profile preferably increases toward a central line of the lens.

Alternatively, it is possible for the axis 114 of the recess to be colinear with the axis normal to the lens and/or with the optical axis of the lens, which enables diffusion of the optical rays by the microstructures to be controlled effectively.

Similarly it is beneficial to maintain the corners of the tiles at the level of the output surface because all these corners form a large area that transmits light with a satisfactory cut-off.

In the embodiment represented in FIG. 5, a secondary microstructure 508 is formed by a recess situated between the microstructures 108 formed as described above in their respective meshes 106. In this case, this secondary microstructure 508 is tangential to the main microstructures 108 so as to maintain symmetrical occupation of the surface 104 by the recesses at the same time as increasing the area dedicated to the recesses at the level of the carrier surface.

This embodiment increases the diffusion of light and reduces the sharpness of the cut-off in the beam. In fact, the radius of such a microstructure corresponds to the distance between a corner of the pattern and the edge of the circle along the diagonal.

Moreover, the profile of the recess may be predetermined by mathematical modelling of its surface, for example by means of a polynomial function that enables coefficients of this polynomial function to be modified in order to test different profiles on the same type of lens.

The present invention lends itself to numerous variants. Notably, the tiles may be square, rectangular or of any other shape enabling satisfactory meshing of the surface. Similarly, the level differences and the secondary level differences have been described as being recesses or hollows. The same characteristics and the same advantages could be obtained with level differences or secondary level differences in the form of reliefs or bosses. Moreover, the same lens could include both these kinds of level difference, some of the level differences being bosses, others being hollows. Similarly some of the secondary level differences could be bosses, others being hollows.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A method of manufacturing a lens for motor vehicle lighting modules, said method being intended to generate on an output surface of said lens microstructures formed by level differences situated on said output surface, said method including the following steps:

forming a meshing on said output surface of said lens such that each mesh has similar dimensions; and generating in each mesh a microstructure formed by an output surface level difference, each level difference having a profile that varies as a function of the position of the mesh on the output surface of the lens;

wherein the method includes the additional step of generating secondary level differences situated between different meshes.

2. The method according to claim 1, wherein the method includes the step of forming a meshing having meshes the patterns of which form tiles or concentric rings.

3. The method according to claim 2, wherein the profile of each level difference is predetermined as a function of the distance of its mesh from a central part of the mesh so that at least one common dimension of the level differences decreases with this distance.

4. The method according to claim 1, wherein the method includes the step of generating the level differences or the secondary level differences so that each level difference or each secondary level difference has an axis of symmetry.

5. The method according to claim 4, wherein the axis of symmetry corresponds to an axis of revolution or an axis of rotation.

6. The method according to claim 5, wherein a contour of the level difference or the secondary level difference in a plane perpendicular to the axis of symmetry is circular or elliptical.

7. The method according to claim 6, wherein the axis of symmetry of each level difference or each secondary level difference is parallel to an axis normal to the output surface of the lens and/or to an optical axis of the lens.

8. The method according to claim 5, wherein the axis of symmetry of each level difference or each secondary level difference is parallel to an axis normal to the output surface of the lens and/or to an optical axis of the lens.

9. The method according to claim 4, wherein the axis of symmetry of each level difference or each secondary level difference is parallel to an axis normal to the output surface of the lens and/or to an optical axis of the lens.

10. The method according to claim 1, wherein the profile of each level difference is predetermined as a function of the distance of its mesh from a central part of the mesh so that at least one common dimension of the level differences decreases with this distance.

11. The method according to claim 1, wherein, in the mesh, edges of the level difference are situated at the level of the output surface of the lens.

12. The method according to claim 1, wherein the profile of the level difference or the secondary level difference is predetermined by mathematical modeling.

13. A lens for motor vehicle lighting modules having an output surface provided with microstructures formed by level differences generated on its output surface, wherein these level differences being generated on its output surface by a manufacturing method according to claim 1:

the level differences form a meshing on the output surface of said lens such that each mesh has similar dimensions; and the level differences have a predetermined profile depending on the position of the mesh on the output surface of the lens, and the secondary level differences are situated between different meshes.

14. The lens according to claim 13, wherein the level differences or the secondary level differences are recesses.

15. The lens according to claim 14, wherein the level differences or the secondary level differences are reliefs.

16. The lens according to claim 15, wherein the surface of the level differences or the secondary level differences is continuous.

17. The lens according to claim 14, wherein the surface of the level differences or the secondary level differences is continuous.

18. The lens according to claim 14, wherein the surface of the level differences or the secondary level differences is continuously variable.

19. The lens according to claim 13, wherein the surface of the level differences or the secondary level differences is continuously variable.

20. A motor vehicle lighting module including a lens having an output surface provided with microstructures formed by level differences generated on its output surface, wherein these level differences being generated on its output surface by a manufacturing method according to claim 1:

the level differences form a meshing on the output surface of said lens such that each mesh has similar dimensions;

the level differences have a predetermined profile depending on the position of the mesh on the output surface of the lens; and the secondary level differences are situated between different meshes.

21. The lens according to claim 20, wherein the level differences or the secondary level differences are recesses.

22. The lens according to claim 20, wherein the level differences or the secondary level differences are reliefs.

23. The lens according to claim 20, wherein the surface of the level differences or the secondary level differences is continuous.

24. The lens according to claim 20, wherein the surface of the level differences or the secondary level differences is continuously variable.

25. A motor vehicle lighting module including a lens having an output surface provided with microstructures formed by level differences generated on its output surface, wherein:

the level differences form a meshing on the output surface of said lens such that each mesh has similar dimensions;

the level differences have a predetermined profile depending on the position of the mesh on the output surface of the lens; and the secondary level differences are situated between different meshes.

* * * * *